W. F. FEY.
Beer-Cooler.

No. 207,264. Patented Aug. 20, 1878.

Attest
John E. Jones.
J. Hillings

Inventor.
William F. Fey
By F. McIlvain
Attorney

UNITED STATES PATENT OFFICE.

WILLIAM F. FEY, OF CINCINNATI, OHIO.

IMPROVEMENT IN BEER-COOLERS.

Specification forming part of Letters Patent No. 207,264, dated August 20, 1878; application filed April 5, 1878.

*To all whom it may concern:*

Be it known that I, WILLIAM F. FEY, of Cincinnati, Hamilton county, and State of Ohio, have invented an Improvement in Cooler and Condenser, of which the following is a specification:

My invention relates to that class of devices through or over which beer or other liquid is permitted to run for the purpose of cooling; and the object of my invention is to obtain a great amount of cooling-surface without exposing the beer or other liquid to the atmosphere.

My invention consists of a series of cylinders, placed in a vertical array, connected at both ends to each other, and having chambers at each end, each cylinder being provided with a series of connecting-pipes, secured in the inside heads of the chambers in a peculiar manner, which permits easy attachment of the parts for cleaning, &c. The operation is such that the beer or other liquid is permitted to flow into the chamber at one end of the upper cylinder, through the pipes thereof, and into the opposite chamber of the next succeeding cylinder; and the water, or other cooling medium, is permitted to rise, surround the conducting-pipes, and pass from one cylinder to the other upward. The operation may, however, be reversed, and the apparatus used in a vertical as well as horizontal position.

The operation of the apparatus when used as a condenser is the same as for beer or other liquids, the vapors to be condensed entering the same pipe as the beer or other liquids, and passes through the cylinders in the same manner as the beer or other liquids.

Figure 1:
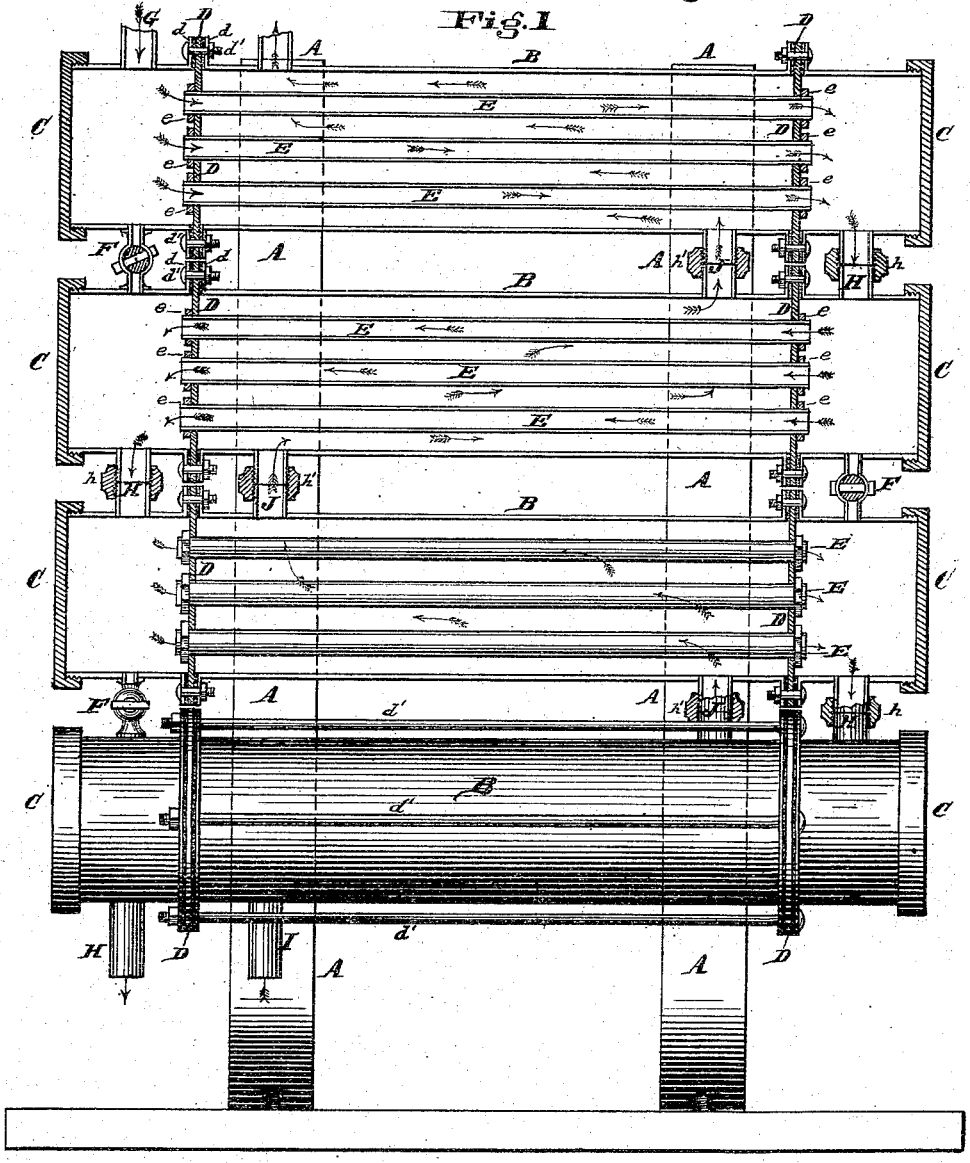
Figure 2:
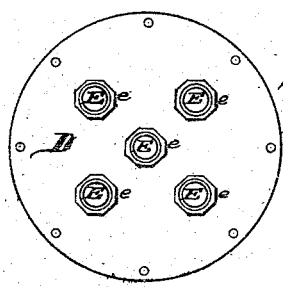

In the accompanying drawings, Figure 1 is a vertical section, partly in elevation, of my improvement. Fig. 2 is a view of the inside head of the chamber, showing the ends of the pipes.

A represents a frame, supporting a series of cylinders, B. Each cylinder, which may be either circular, square, or of any other form in cross-section, is provided with flanges at the end, to which may be attached the detachable heads C, and, inside these heads, heads D are formed, in which are secured conducting-pipes E. Each of the heads D is of a sufficient diameter to extend outside of the diameter of the cylinder, so as to enter between and become flush with the periphery of two flanges, $d$, the whole being secured by a series of bolts, $d'$. The tubes E are secured in these heads at each end by nuts $e$. It will be seen that by the removal of the chambers from one end, and the nuts from the pipes at the opposite end, the heads D may be drawn out, carrying all the tubes with them, and convenience be thus afforded for perfect cleaning. At the end of each cylinder at which the beer or other liquid is received a cock, F, is provided, so that the beer or other liquid collected below the lowest pipe can be drawn off through the chambers.

Beer or other liquid is received at pipe G, and after passing through the first series of pipes E, is conducted into the second cylinder, through pipe H, and so on through all the cylinders of the series, through pipes H, in the manner shown by the arrows.

The water or other cooling medium is received at pipe I from any source of supply, and is conducted into the space around the pipes and between the heads D D. From thence it rises through pipe J to the second chamber, and so on, through similar pipes J, throughout the entire series.

My apparatus, when used as a condenser, which purpose I prefer, is operated in the same manner as when used for cooling beer or other liquids. The vapors from the still are received at pipe G—the same pipe at which the beer or other liquid is received—and pass through pipes E, and are conducted through pipes H from one cylinder to the other until thoroughly condensed. The water is received at pipe I and conducted throughout the entire series of cylinders through pipes J, in the same manner as described for cooling beer or other liquid.

It will be seen that by my apparatus, when used as a condenser, the volume of vapor is compelled to enter a number of pipes, and hence it is condensed in greater volume and with greater rapidity than by the method or apparatus now employed. It will be seen, also, that this form of cooler or condenser gives a great amount of cooling or condensing surface within a small space, and without expensive construction in the apparatus.

My improvement, moreover, permits the addition, at any time, of more cylinders, (as the cylinders are rendered detachable by the use of couplings $h\ h'$ on the two-part pipes H and J,) where greater cooling or condensing surface is required, and admits of a reduction in the number of cylinders to be used in each cooler or condenser.

This capacity for multiplication or reduction, without material interference with the construction of the apparatus, is an important feature in the use, and manufacture for sale, of my cooler or condenser.

Having thus described my invention, what I desire to claim, and secure by Letters Patent is—

The combination of the series of horizontal cylinders B B, having heads C at their ends and interior heads D D, connected by the tubes E E, the inlet-pipe G, cocks F, pipes H, and water-inlet I, all constructed and arranged substantially as and for the purposes herein set forth.

In testimony of which invention I hereunto set my hand.

WM. F. FEY.

Witnesses:
JOHN E. JONES,
CHAS. F. GESSERT.